(12) United States Patent
Edington et al.

(10) Patent No.: US 10,199,658 B2
(45) Date of Patent: Feb. 5, 2019

(54) WOUND THERMAL BATTERIES AND METHODS OF MANUFACTURING THE SAME

(71) Applicant: EAGLEPICHER TECHNOLOGIES, LLC, Joplin, MO (US)

(72) Inventors: Joe Edington, Joplin, MO (US); James Ferraro, Joplin, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 332 days.

(21) Appl. No.: 13/839,824

(22) Filed: Mar. 15, 2013

(65) Prior Publication Data

US 2014/0272504 A1 Sep. 18, 2014

(51) Int. Cl.
| | |
|---|---|
| *H01M 6/36* | (2006.01) |
| *H01M 6/00* | (2006.01) |
| *H01M 4/04* | (2006.01) |
| *H01M 4/08* | (2006.01) |
| *H01M 6/10* | (2006.01) |

(52) U.S. Cl.
CPC ........... *H01M 6/36* (2013.01); *H01M 4/0404* (2013.01); *H01M 4/08* (2013.01); *H01M 6/10* (2013.01); *H01M 6/005* (2013.01); *Y10T 29/49115* (2015.01)

(58) Field of Classification Search
CPC .......... H01M 6/00; H01M 6/36; H01M 6/005; H01M 6/14; H01M 2/162; H01M 4/06; H01M 4/12
See application file for complete search history.

(56) References Cited

U.S. PATENT DOCUMENTS

| | | | |
|---|---|---|---|
| 2,543,106 A * | 2/1951 | Harriss | 429/94 |
| 3,891,460 A * | 6/1975 | Bowser et al. | 136/236.1 |
| 4,596,752 A | 6/1986 | Faul et al. | |
| 4,963,446 A | 10/1990 | Roels et al. | |
| 5,002,843 A * | 3/1991 | Cieslak et al. | 429/101 |
| 5,736,275 A * | 4/1998 | Kaun | H01M 10/399 429/199 |
| 5,972,532 A | 10/1999 | Oweis et al. | |
| 6,475,666 B1 * | 11/2002 | Takeuchi | H01M 2/1666 429/142 |
| 7,442,465 B2 | 10/2008 | Kim et al. | |
| 7,452,627 B2 | 11/2008 | Lee | |
| 7,695,857 B2 | 4/2010 | Min et al. | |
| 7,871,447 B2 | 1/2011 | Dixon et al. | |
| 7,871,722 B2 | 1/2011 | Shin et al. | |

(Continued)

*Primary Examiner* — Kenneth J Douyette
(74) *Attorney, Agent, or Firm* — LSIP Law LLC

(57) ABSTRACT

A thermal battery includes a first conductive layer containing an anode material separated from a second conductive layer containing a cathode material by a separator layer containing a separator material; and a flexible pyrotechnic heat source, wherein the first conductive layer, the separator layer, and the second conductive layer are rolled together to form the spiral wound configuration. A method of manufacturing a thermal spiral wound battery includes preparing three slurries, each containing one of an anode material, a cathode material, and a separator material, depositing each of the materials from the slurries onto conductive substrates to form three layers, stacking the layers, and winding the layers together into a spiral wound configuration.

18 Claims, 6 Drawing Sheets

(56) References Cited

U.S. PATENT DOCUMENTS

| | | | |
|---|---|---|---|
| 7,926,169 B1 | 4/2011 | Dixon et al. | |
| 8,052,764 B2 | 11/2011 | Dixon et al. | |
| 2002/0192542 A1* | 12/2002 | Luski | H01M 10/0436 429/144 |
| 2004/0185332 A1* | 9/2004 | Botos | H01M 2/263 429/96 |
| 2005/0208383 A1* | 9/2005 | Totsuka | H01M 2/162 429/247 |
| 2007/0099080 A1* | 5/2007 | Pickett, Jr. | H01M 4/38 429/188 |
| 2008/0289676 A1* | 11/2008 | Guidotti et al. | 136/200 |
| 2009/0186273 A1* | 7/2009 | Lee | H01M 4/134 429/217 |
| 2011/0033743 A1* | 2/2011 | Lee | H01M 2/1653 429/145 |

* cited by examiner

WOUND THERMAL BATTERIES AND METHODS OF MANUFACTURING THE SAME

BACKGROUND

This disclosure relates to thermal-batteries and methods of manufacturing thermal batteries that have a rolled or coiled electrode assembly, otherwise known as a "spiral wound" or "Swiss roll" configuration.

Thermal batteries are primary reserve batteries that utilize an electrolyte that, at ambient temperatures, is a nonconductive solid in a non-activated state. Thus, at ambient temperatures, the electrolyte is solid and inert. When the thermal battery is in use and reaches an operating temperature, the electrolyte becomes molten and is in an activated state. As primary electrical sources, thermal batteries generate a single, continuous energy output once activated. The output interval varies from a few seconds to over an hour depending on the battery type, construction, and design.

In order to achieve an activated state, thermal batteries are provided with a pyrotechnic that is in close proximity to the electrolyte. Once the pyrotechnic is ignited, the thermal reaches a temperature typically within the range of 450° C. to 600° C., wherein the battery reaches an activated state.

Thermal batteries are beneficial in that they provide a large amount of energy relative to their volume. Additionally, as long as they are stored properly (e.g., sealed), thermal batteries may be used years after storage, such as for at least ten or more years, without showing signs of degradation and decay and without the need for additional pre-ignition preparation prior to use. Because of these factors, thermal batteries are useful in many different applications and environments. For example, thermal batteries are used in missile systems such as Joint Direct Attack Munition (JDAM), Stinger, Javelin, BAT smart missiles, as well as other systems such as sonar buoys and ejector seats. Because many of these applications require long periods of storage time before use, thermal batteries are ideal choices for permanent installation as they themselves can experience long periods of non-use.

Typical thermal battery manufacturing processes use pellets, which are then loaded into a cell stack. Specifically, a pressing machine is used to press powders to form anodes, cathodes, electrolytes, and pyrotechnics pellets. The powder material may comprise any number of chemicals or compositions that are known to be useful in thermal batteries. Once the powder material for each element (i.e., the anode, cathode, electrolyte, and pyrotechnic) have been formed into a pellet, the pellets are then stacked in the cell stack in an alternating manner. Conventional thermal batteries and methods of making thermal batteries are disclosed, for example, in U.S. Pat. No. 8,052,764; U.S. Pat. No. 7,871,447; and U.S. Pat. No. 7,926,169, the entire disclosures of which are herein incorporated by reference.

Although conventional thermal batteries are beneficial for the reasons discussed above, the powder pressing step during manufacture limits the size, thickness, and geometry of the cell components, including the cathode and the anode. Additionally, the components tend to be brittle. As a result, conventional thermal batteries are limited to having a planar shape.

SUMMARY

Provided is a thermal battery comprising: a first conductive layer containing an anode material separated from a second conductive layer containing a cathode material by a separator layer containing a separator material; and a flexible pyrotechnic heat source, wherein the first conductive layer, the separator layer, and the second conductive layer are rolled together to form a spiral wound configuration.

Also provided is a method of manufacturing a spiral wound thermal battery comprising: preparing a first slurry comprising an anode material, a first polymeric binder, and a first volatile solvent; depositing the anode material from the first slurry onto a first conductive substrate to form a first conductive layer; preparing a second slurry comprising a cathode material, a second polymeric binder, and a second volatile solvent; depositing the cathode material from the second slurry onto a second conductive substrate to form a second conductive layer; preparing a third slurry comprising an electrolyte/separator material, a third polymeric binder, and a third volatile solvent; depositing the electrolyte/separator material from the third slurry onto a third conductive substrate to form a separator layer; stacking the first conductive layer, the separator layer, and the second conductive layer such that the separator layer separates the first conductive layer and the second conductive layer; and winding the first conductive layer, the separator layer, and the second conductive layer together into a spiral wound configuration.

DETAILED DESCRIPTION OF THE EMBODIMENTS

A thermal battery having a spiral wound configuration results in a thermal battery having a number of advantages over conventional thermal batteries that do not have a spiral wound shape. Manufacturing a thermal battery by preparing a slurry comprising a battery material, a polymeric binder, and a volatile solvent; depositing the battery material from the slurry onto a conductive substrate; and winding the conductive substrate into a jellyroll configuration results in a thermal battery having a spiral wound configuration as opposed to the conventional methods of making thermal batteries, which results in a thermal battery having a planar shape. A thermal battery having a spiral wound design is suitable for use in a variety of applications that typical thermal batteries are not suitable for, such as defense and commercial applications including fuzing applications, down-hole applications, and high-spin applications. Additionally, the disclosed method produces low cost, high volume thermal batteries compared with conventional methods for producing thermal batteries.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

As used herein, the term "operating temperature" refers to a temperature at which the thermal battery becomes thermally active and is typically from about 350° C. to 600° C., such as from about 450° C. to about 500° C., from about 490° C. to about 560° C., or from about 550° C. to about 600° C.

As used herein, the term "ambient temperature" refers to a temperature at which the thermal battery is in an inactivated state, and is lower that the operating temperature.

Spiral Wound Thermal Battery

Figure 1:
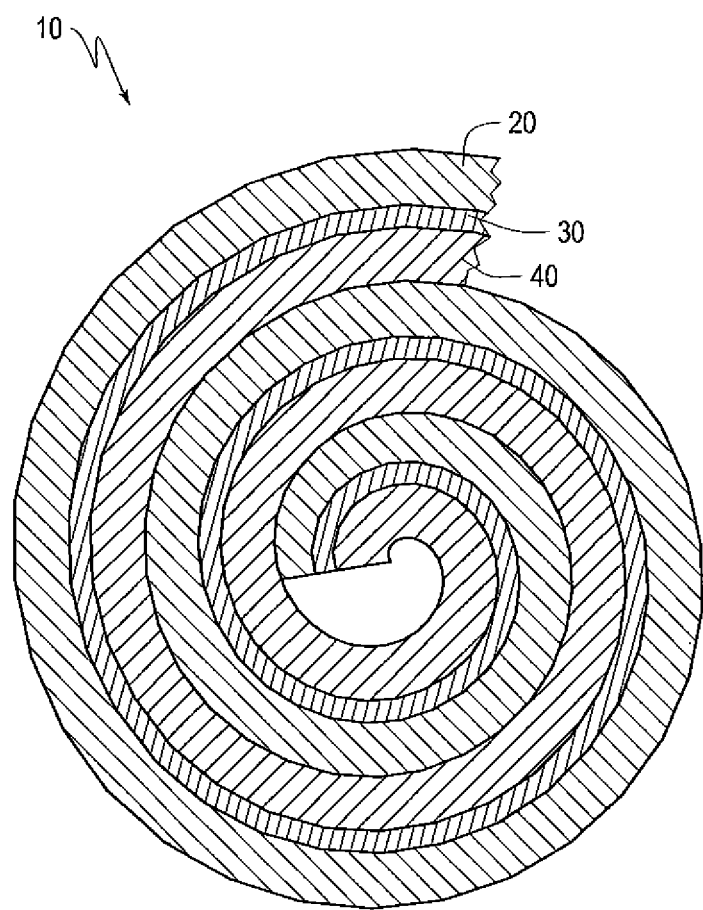
FIG. 1 is a cross sectional view of a first embodiment of a spiral wound thermal battery.
Figure 2:
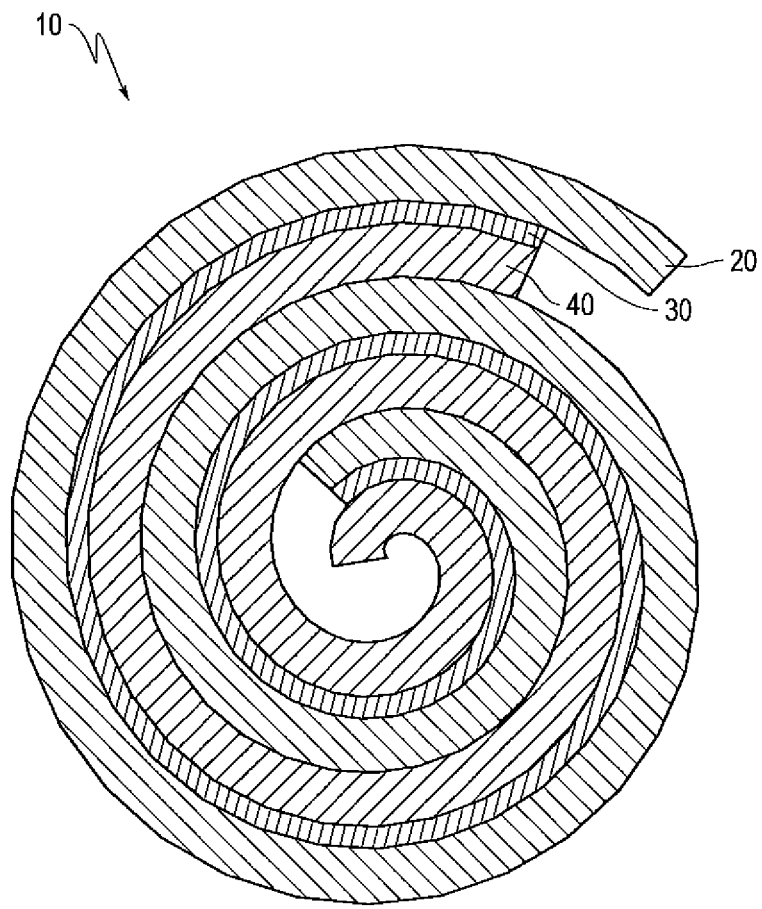
FIG. 2 is a cross sectional view of a second embodiment of a spiral wound thermal battery.
Figure 3:
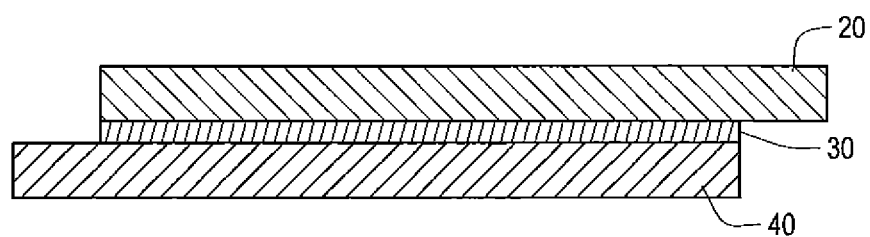
FIG. 3 is a cross sectional view of the battery component layers before they are wound into a spiral wound configuration.
Figure 4:
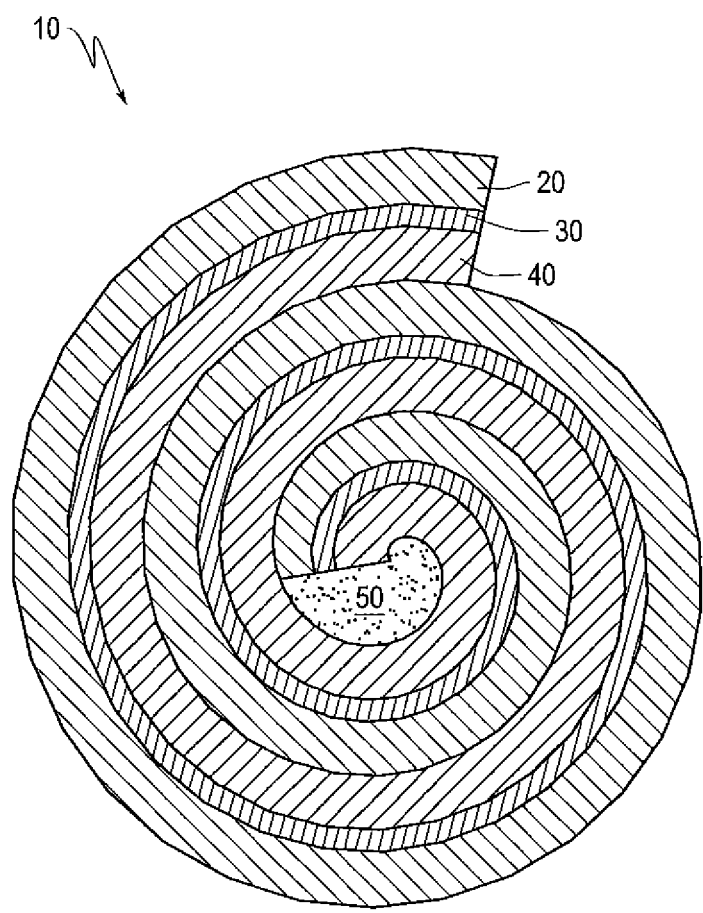
FIG. 4 is a cross sectional view of a third embodiment of a spiral wound thermal battery.

As shown in FIGS. 1 and 2, a spiral wound thermal battery 10 generally includes a first conductive layer 20 separated from a second conductive layer 40 by an electrolyte/separator layer 30, wherein the first conductive layer 20, the electrolyte/separator layer 30, and the second conductive layer 40 are rolled together in a spiral wound configuration. If a non-sacrificial conductive substrate is used in manufacturing the spiral wound thermal battery, the spiral wound thermal battery may additionally comprise the non-sacrificial conductive substrate as a structural feature. As shown in FIGS. 2 and 3, the first conductive layer 20 and the second conductive layer 40 may be offset from each other such that the first conductive layer 20 extends beyond the electrolyte/separator layer 30 and the second conductive layer 40 in a first direction, while the second conductive layer 40 extends beyond the electrolyte/separator layer 30 and the first conductive layer 20 in a second direction, which opposes the first direction. As shown in FIG. 4, a spiral wound thermal battery 10 may additionally include a pyrotechnic heat source 50.

Figure 5:
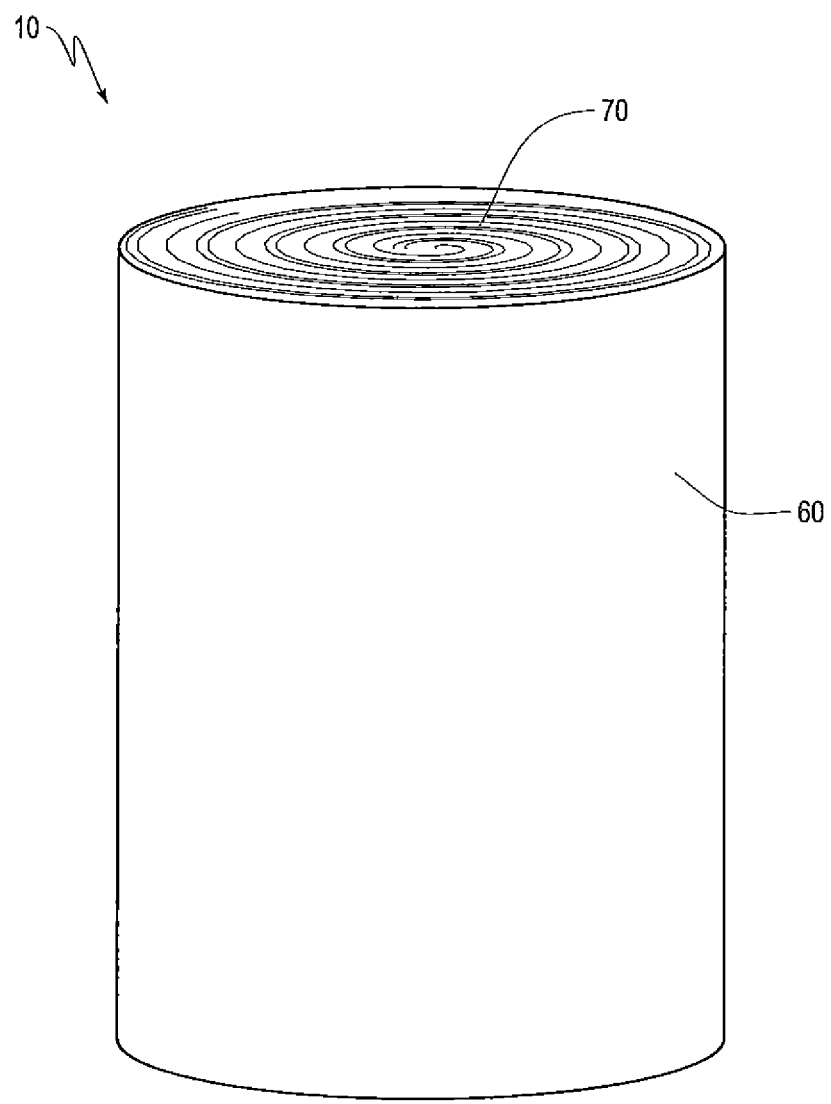
FIG. 5 is an exemplary spiral wound thermal battery.

As shown in FIG. 5, the spiral wound thermal battery 10 further comprises a battery casing 60 that houses the spiral wound configuration 70. Suitable materials that may be used for the battery casing include metals capable of surviving battery operating temperatures, such as stainless steel, steel, aluminum, titanium, and the like, and ceramic materials. The casing material must also be capable of hermetic sealing through a welding, brazing, or other joining techniques.

The spiral wound thermal battery may also include an external terminal as a connection to an external electrical circuit. Suitable terminals include external, isolated terminals for both the anode and the cathode, or a single, isolated terminal for either the anode or the cathode and the casing material as the other terminal, provided that a conductive casing material is used.

Additionally, the spiral wound thermal battery may include a first conductive tab connected to the first conductive layer and protruding from the spiral wound configuration, and a second conductive tab connected to the second conductive layer and protruding from the spiral wound configuration. Suitable materials for the first or second conductive tab include iron, stainless steel, nickel, aluminum, and copper. Additional suitable materials include any other material (1) capable of being joined to the current collecting substrate, the external battery terminal(s), and/or the casing; and (2) capable of surviving battery operating temperatures.

The battery may be tightly wound to reduce interfacial resistance between the electrolyte/separator and the anode and cathode components, such that all of the layers are in intimate contact. The tightness of the winding may be controlled by the thickness of the current collectors, i.e., the conductive substrates. Thinner current collectors are not as subject to buckling and are easier to wind tightly as compared to thicker current collectors. Tighter winding of the battery allows for longer components to be used, which may increase the capacity of the cell and the surface area of the cathode and the anode.

Coating Substrate

The substrate may be either a sacrificial or a non-sacrificial conductive substrate. A sacrificial substrate is removed from the coated battery component prior to use of the battery component in the battery, while a non-sacrificial substrate becomes an integral component of the battery. If the conductive substrate is non-sacrificial, the conductive substrate may act as a structural component of the thermal spiral wound battery and as a current collector.

Suitable sacrificial conductive substrates include Mylar, waxed paper, or any other flexible substrate capable of being removed from the dried coating.

Suitable non-sacrificial conductive substrates include those compatible with the thermal battery cell components at operating temperatures, such as stainless steel, iron, copper, aluminum, and nickel.

Conductive Layers

At least one of the first conductive layer and the second conductive layer is a layer containing an anode material, and the other conductive layer is a layer containing a cathode material. The anode material may include an anode active material, an anolyte, and a polymeric binder, and the cathode material may include a cathode active material, a catholyte, and a polymeric binder.

The conductive layers may have a thickness from about 0.001 to about 0.020 inches (in), such as from about 0.001 to about 0.006 in, from about 0.005 to about 0.010 in, or from about 0.008 to about 0.020 in. The length and width of the conductive layers are dependent upon (1) the desired battery size, such as a D cell size, and (2) the desired capacity of the cell.

Suitable anode active materials include LiSi, LiAl, and other similar lithium-bearing intermetallic compounds capable of surviving battery operating temperatures. The anode active material may be present in the anode material layer in an amount of from about 40 to about 80 wt %, such as from about 40 to about 62 wt %, from about 60 to about 70 wt %, or from about 68 to about 80 wt %, based on a total weight of the anode material layer.

Suitable anolytes include a salt capable of melting at an operating temperature of the thermal battery, such as lithium chloride, potassium chloride, potassium bromide, lithium fluoride, lithium bromide, or mixtures thereof. The anolyte may be present in the anode material layer in an amount of from about 10 to about 40 wt %, such as from about 10 to about 22 wt %, from about 20 to about 30 wt %, or from about 28 to about 40 wt %, based on a total weight of the anode material layer.

Suitable cathode active materials include $FeS_2$, FeS, $NiS_2$, $CoS_2$, $CuFeS_2$, or mixtures thereof. The cathode active material may be present in the cathode material layer in an amount of from about 40 to about 80 wt %, such as from about 40 to about 62 wt %, from about 60 to about 70 wt %, or from about 68 to about 80 wt %, based on a total weight of the cathode material layer.

Suitable catholytes include a salt capable of melting at an operating temperature of the thermal battery, such as lithium chloride, potassium chloride, potassium bromide, lithium fluoride, lithium bromide, or eutectic mixtures thereof. The catholyte may be present in the cathode material layer in an amount of from about 10 to about 40 wt %, such as from about 10 to about 22 wt %, from about 20 to about 30 wt %, or from about 28 to about 40 wt %, based on a total weight of the cathode material layer.

Suitable polymeric binders include binders that do not generate a deleterious reaction by consuming cathode and/or anode active materials or by generating excessive internal gas pressure within the battery casing at the operating temperature of the thermal battery, such as polyisobutylene. If a sacrificial conductive substrate is used in manufacturing the spiral wound thermal battery, the polymeric binder may additionally include a releasing agent. The polymeric binder may be present in each of the conductive layers in an amount from about 0 to about 10 wt %, such as from about 0 to about 6 wt %, from about 5 to about 9 wt %, or from about 7 to about 10 wt %, based on a total weight of each of the conductive layers.

Suitable releasing agents include polymethylmethacrylate (PMMA). The releasing agent may be present in the polymeric binder in an amount of from about 10 to about 30 wt %, such as from about 10 to about 16 wt %, from about 15 to about 25 wt %, or from about 24 to about 30 wt %, based on a total weight of the polymeric binder.

Electrolyte/Separator Layer

The electrolyte/separator layer is a nonconductive solid at ambient temperatures and molten at operating temperatures. The electrolyte/separator layer comprises a salt, an inorganic material, and a polymeric binder.

The electrolyte/separator layer may have a thickness from about 0.001 to about 0.020 in, such as from about 0.001 to about 0.006 in, from about 0.005 to about 0.010 in, or from about 0.008 to about 0.020 in. The length and width of the electrolyte/separator layer may be dependent on (1) the desired battery size, such as a D cell size, or (2) the desired capacity of the cell.

Suitable salts include those capable of melting at an operating temperature of the thermal battery, such as alkali halides including lithium chloride, potassium chloride, lithium bromide, potassium bromide, lithium fluoride, potassium bromide, lithium fluoride, lithium bromide, or mixtures thereof. The salt may be present in the electrolyte/separator layer in an amount of from about 40 to about 80 wt %, such as from about 40 to about 55 wt %, from about 50 to about 65 wt %, or from about 60 to about 80 wt %, based on a total weight of the electrolyte/separator layer.

Suitable inorganic materials include those capable of immobilizing the molten salt, such as magnesium oxide, aluminum oxide, aluminum nitride, boron nitride, and mixtures thereof. The inorganic material may be present in the electrolyte/separator layer in an amount of from about 25 to about 55 wt %, such as from about 25 to about 37 wt %, from about 35 to about 45 wt %, or from about 43 to about 55 wt %, based on a total weight of the electrolyte/separator layer.

Suitable polymeric binders include those disclosed above with respect to the conductive layers. The polymeric binder may be present in the electrolyte/separator layer in an amount of from about 0 to about 10 wt %, such as from about 0 to about 5 wt %, from about 4 to about 8 wt %, or from about 7 to about 10 wt %, based on a total weight of the electrolyte/separator layer.

Pyrotechnic Heat Source

A pyrotechnic heat source may be included in the spiral wound thermal battery to provide an internal heat source. The pyrotechnic heat source may be incorporated into the battery by including the heat source as a layer wound into the battery along with the other battery components or by wrapping the pyrotechnic heat source layer around the circumference of the spiral wound configuration. The pyrotechnic heat source may be made of a non-conductive pyrotechnic material or a conductive pyrotechnic material. The amount pyrotechnic heat source in the spiral wound thermal battery is dependent on the mass of the other battery components and the desired active life of the battery. However, in all cases, a sufficient amount of pyrotechnic heat source material is incorporated into the battery to (1) melt all of the salt components included in the electrolyte/separator, the anolyte, and the catholyte; and (2) keep the salts in a molten state for the duration of the battery life.

Suitable non-conductive pyrotechnic materials include a ceramic or fiber paper filled with barium chromate and powdered zirconium metal.

Suitable conductive pyrotechnic materials include mixtures of iron powder and potassium perchlorate or mixtures of nickel, zirconium, and potassium perchlorate.

When a conductive pyrotechnic material is used, the spiral wound thermal battery additionally includes an inorganic insulation layer to prevent a short circuit from developing when the cell is wound. Suitable inorganic insulation layers include ceramic materials, such as alumina silicate fibers, alumina fibers, borosilicate glass fibers, and other ceramic fiber materials. The insulating material may be incorporated within the windings of the battery components between the heat source and the anode, or between the heat source and the cathode to prevent electrical contact between the cathode and the anode to avoid an electrical short circuit within the battery.

The spiral wound battery may be activated by an external heat source from the environment, if available, or by igniting the pyrotechnic heat source with the aid of an external stimulus, such as an electrical pulse, percussion, or acceleration. When an external stimulus is required, an ignition source is incorporated inside the battery casing to ignite the pyrotechnic heat source. Suitable ignition sources include electrically-activated igniters, percussion primers, and acceleration-activated inertial igniters.

Method of Making a Spiral Wound Thermal Battery

A method of making a spiral wound thermal battery comprises preparing a slurry containing a battery material, such as an anode material, a polymeric binder, and a volatile solvent; depositing the anode material from the slurry onto a conductive substrate to form a first conductive layer, similarly forming (1) a separator layer containing a separator material in place of the anode material, and (2) a second conductive layer containing a cathode material in place of the anode material, stacking the first conductive layer, the separator layer, and the second conductive layer, and winding the stacked layers into a spiral wound configuration, such as that shown in FIGS. 1 and 2. Before the layers are wound together, conductive tabs may be joined to the first conductive layer and the second conductive layer, and the battery is then assembled by winding the individual components together to produce a spiral wound configuration of current collector, cathode, electrolyte, anode, and current collector.

The battery component layers may be assembled by calendaring or laminating the electrolyte/separator layer to the cathode layer or the anode layer such that the layers adhere to one another. At this time, the sacrificial layer, such as Mylar, may be removed from the electrolyte/separator layer.

For batteries not containing a pyrotechnic heat source, prior to winding the layer sequence may be current collector, cathode layer, electrolyte/separator layer, anode layer, current collector, and insulating or a pyrotechnic heat source as a circumferential wrapping layer.

For batteries containing a non-conductive pyrotechnic heat source, prior to winding the layer sequence may be current collector, cathode layer, electrolyte/separator layer, anode layer, current collector, non-conductive pyrotechnic heat source.

For batteries containing a conductive pyrotechnic heat source, prior to winding the layer sequence may be current collector, cathode layer, electrolyte/separator, anode layer, current collector, pyrotechnic heat source, and insulation layer.

In all instances that a pyrotechnic heat source is included in the battery, a circumferential insulating wrap may be placed between the spiral wound battery and the batter casing to provide thermal insulation.

The first conductive layer containing the anode material is separated from the second conductive layer containing the cathode material by the separator layer. Before winding the layers into the spiral wound configuration, the anode material and cathode material may be offset sufficiently from each other to prevent these layers from making contact during the winding process. For example, the anode material may extend beyond the separator material and the cathode material in one direction; whereas, the cathode material may extend beyond the separator material and the anode material in an opposite direction. The layers may then be rolled together to form the spiral wound electrode assembly. The offset allows for the anode material to extend outwards at one end of the assembly forming the anode electrode, while the opposite end of the assembly has the cathode material extending outwards forming the cathode electrode. The electrodes may be connected to terminals of a battery casing for use as a battery.

The battery material includes at least one of the above described materials for the conductive layers and the electrolyte/separator layer. The battery material may be present in the slurry in an amount of from about 30 to about 70 wt %, such as from about 30 to about 45 wt %, from about 40 to about 50 wt %, or from about 55 to about 70 wt %, based on a total amount of the slurry.

Suitable polymeric binders include those described above and may be present in the slurry in an amount of from about 0 to about 5 wt %, such as from about 0 to about 2 wt %, from about 1 to about 4 wt %, or from about 3 to about 5 wt %, based on a total amount of the slurry.

A volatile solvent is a solvent that evaporates at room temperature. Suitable volatile solvents include non-polar solvents containing no acidic hydrogens and capable of dissolving the polymeric binder, such as toluene, xylene, and mixtures thereof. The amount of the volatile solvent present in the slurry may be dependent on the density of the battery material. Particularly, the volatile solvent may be present in the slurry in an amount of from about 30 to about 70 wt %, such as from about 30 to about 45 wt %, from about 40 to about 60 wt %, or from about 55 to about 70 wt %, based on a total amount of the slurry.

Depositing the battery material from the slurry onto a conductive substrate may be done by any known method. For example, depositing the battery material may include casting the slurry under a doctor blade to deposit a controlled amount of the slurry onto the conductive substrate, and evaporating the volatile solvent to form a flexible battery component.

If a sacrificial conductive substrate is used, the method additionally includes releasing the battery component from the sacrificial conductive substrate. The cast parts may then be cut into an appropriate size or shape for the desired cell dimensions.

The amount of slurry deposited onto the conductive substrate depends on the viscosity of the slurry, the speed of casting, and the gap of the doctor blade. These variables may be manipulated to produce the desired thickness of the deposited material to fulfill the capacity requirements of the battery design.

Evaporating the volatile solvent may be done by, for example, heating the conductive substrate to a temperature of from about 25° C. to about 100° C., such as from about 25° C. to about 55° C., from about 50° C. to about 80° C., or from about 75° C. to about 100° C., depending upon the drying characteristic of the battery material being produced.

The method of producing a spiral wound thermal battery may further include processing the flexible battery component by calendaring or lamination. Calendaring may be used to increase the density of the cast component when adhered to a conductive substrate. Lamination may be used to increase the density and thickness of the components not adhered to a conductive substrate by adding layers.

The method of producing a spiral wound thermal battery may additionally include adding a pyrotechnic heat source before winding the battery components into the spiral wound configuration as described above. Suitable pyrotechnic heat sources are described above.

EXAMPLES

The following Examples are being submitted to illustrate exemplary embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

Example 1: One-Cell Spiral Wound Thermal Battery

A cathode component was manufactured by producing a slurry containing 17.5 g of $FeS_2$, 7.5 g of a catholyte sale, 10 g of a binder solution (8 wt % polyisobutylene (molecular weight Mw of about 1,000,000); 92 wt % toluene), and 5 g toluene. The cathode slurry was cast onto a 0.003 inch thick stainless steel plate and allowed to dry. After drying, the cast cathode was cut to approximately 1 inch wide by 6 inch long, leaving approximated ¼ inch of bare stainless steel for attaching a terminal lead at a later time.

Similarly, an anode component was produced using a slurry containing 17.5 g of LiSi powder, 7.5 g of an anolyte sale, 18 g of a binder solution (5 wt % polyisobutylene (Mw of about 4,600,000); 95 wt % toluene), and 9 g toluene. The anode slurry was cast onto a 0.003 inch thick stainless steel plate and allowed to dry. After drying, the cast anode was cut to approximately 1 inch wide by 6 inch long, leaving approximated ¼ inch of bare stainless steel for attaching a terminal lead at a later time.

The electrolyte/separator component was manufactured by producing a slurry containing 15 g of electrolyte salt containing magnesium oxide, 6 g of a binder solution (5 wt % polyisobutylene (Mw of about 4,600,000); 95 wt % toluene), and 11 g toluene. The electrolyte/separator component was cast onto silicone-coated Mylar and allowed to dry. After drying, the electrolyte/separator component was transferred onto the cathode component by laminating the two components together in a Carver press at 10 tons. The anode component was also pressed at 10 tons to increase density.

Terminal tabs were spot welded to the bare stainless steel ends for both the cathode and the anode components. Zirconium/barium chromate heat paper was taped to the back side of the anode component to serve as both a pyrotechnic heat source and an insulating layer between the cathode and the anode current collectors during winding.

The components were stacked and tightly wound around a 1 inch length of steel tubing (½ inch outer diameter) by hand to prevent the current collectors from buckling during winding. The wound cell was then wrapped with glass-reinforced tape to hold the wound shape. Fiberfrax insulation was wrapped around the wound shape to provide thermal insulation for the wound cell. The wound cell was then placed inside of a casing equipped with an electric match to initiate the battery. The battery was activated and tested using a 1 amp base load with a 5 amp pulse for a 60 second life.

Figure 6:
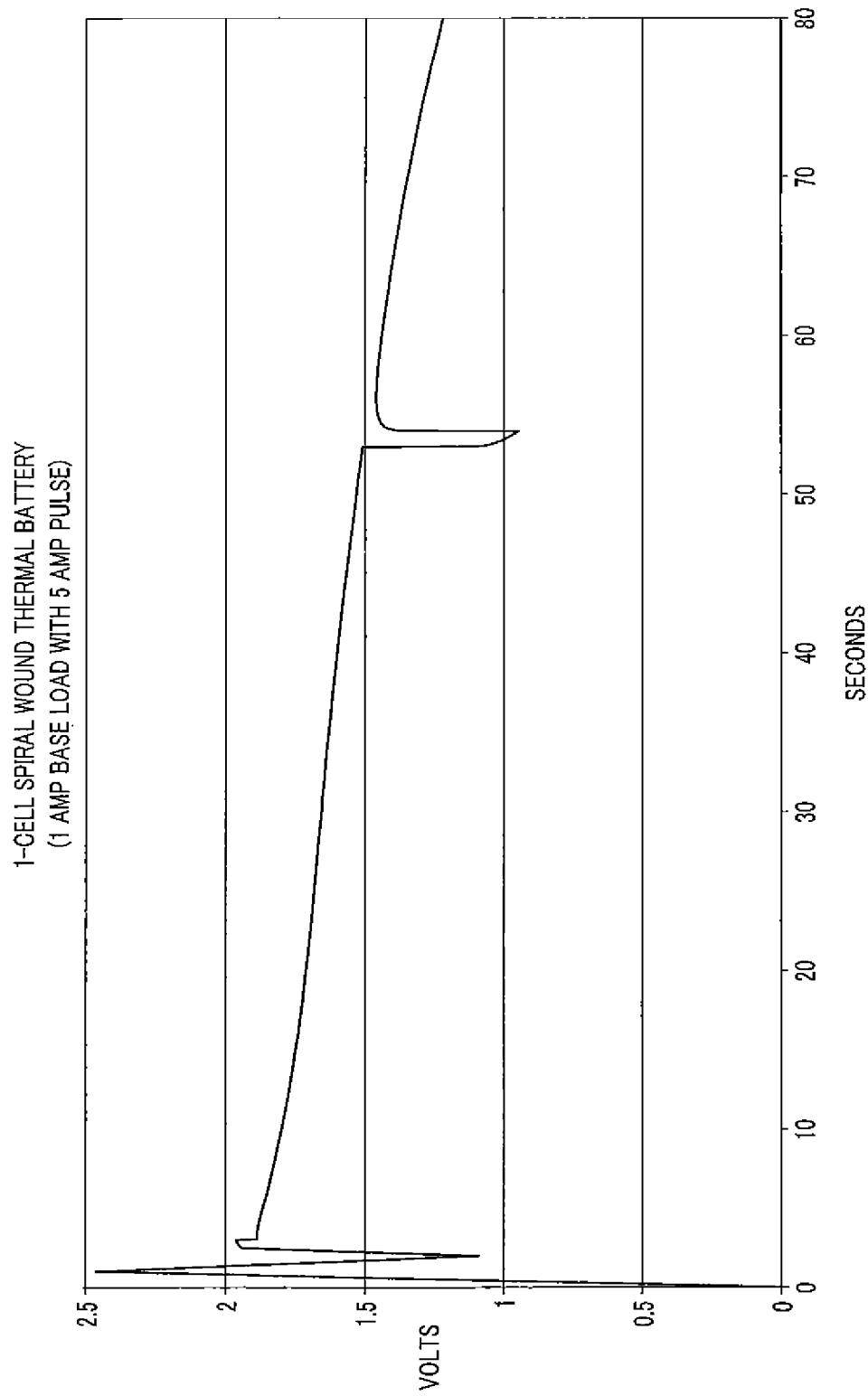
FIG. 6 is a graph showing the voltage of a battery made according to Example 1 over time.

FIG. 6 is a graph showing the results of the test.

Example 2: Two-Cell Spiral Would Thermal Battery

A two-cell spiral wound battery was produced using the same manufacturing technique described in Example 1, with the exception that two cells were wound together, in series to produce a higher battery voltage. The winding process differed in that the stack of cells prior to winding was: cathode current collector (with terminal tab), cathode, electrolyte/separator, anode, anode current collector, cathode current collector, cathode, electrolyte/separator, anode, and anode current collector (with terminal tab). The heat paper was taped to the back side of the outer anode current collector as it was in Example 1. The remainder of the battery manufacturing process and test conditions was the same as Example 1. The battery was activated and tested as in Example 1.

Figure 7:
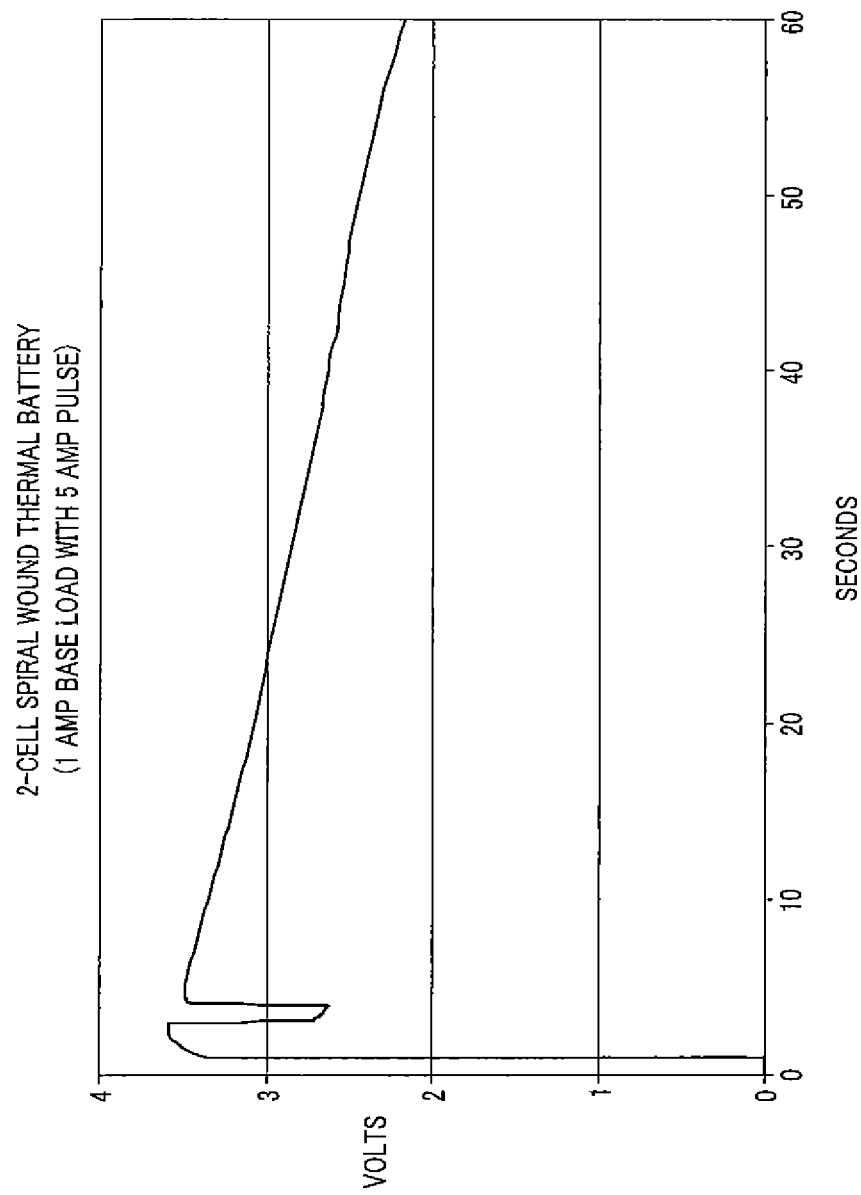
FIG. 7 is a graph showing the voltage of a battery made according to Example 1 over time.

FIG. 7 is a graph showing the results of the test.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A thermal battery comprising:
   a first conductive layer containing an anode material separated from a second conductive layer containing a cathode material by a separator layer containing a separator material, wherein the separator material comprises an electrolyte and a polymeric binder, wherein the polymeric binder comprises of polymethylmethacrylate present in about 10 wt % to about 30 wt % of the polymeric binder;
   a flexible pyrotechnic heat source;
   wherein the first conductive layer, the separator layer, and the second conductive layer are rolled together to form a spiral wound configuration, the flexible pyrotechnic heat source being included as a layer spirally wound into the thermal battery to be incorporated within the windings of the first conductive layer, the separator layer, and the second conductive layer;
   a battery casing housing the spiral wound configuration; and
   a first conductive tab connected to the first conductive layer and a second conductive tab connected to the second conductive layer, wherein the first conductive tab and the second conductive tab protrude from the spiral wound configuration;
   wherein the first conductive tab is further joined to an anode current collector, a first external battery terminal and the battery casing, and wherein the second conductive tab is further joined to a cathode current collector, a second external battery terminal and the battery casing;
   further, wherein the first conductive layer and the second conductive layer are offset from each other such that the first conductive layer extends beyond the separator layer and the second conductive layer in a first direction, while the second conductive layer extends beyond the separator layer and the first conductive layer in a second direction, which opposes the first direction.

2. The thermal battery of claim 1, wherein:
   the electrolyte is a nonconductive solid at ambient temperatures; and
   the electrolyte is molten at operating temperatures of the thermal battery.

3. The thermal battery of claim 2 wherein the operating temperatures are from about 350° C. to about 600° C.

4. The thermal battery of claim 1, wherein an outermost layer of the spiral wound configuration is the first conductive layer.

5. The thermal battery of claim 1, wherein an outermost layer of the spiral wound configuration is the second conductive layer.

6. The thermal battery of claim 1, wherein:
   the first conductive layer has a thickness of from about 0.001 inches to about 0.020 inches;
   the second conductive layer has a thickness of from about 0.001 inches to about 0.020 inches; and
   the separator layer has a thickness of from about 0.001 inches to about 0.020.

7. The thermal battery of claim 1, wherein the flexible pyrotechnic heat source is located between the cathode current collector and the anode current collector.

8. The thermal battery of claim 1, wherein the flexible pyrotechnic heat source is circumferentially wrapped around the spiral wound configuration.

9. The thermal battery of claim 5, wherein:
   the flexible pyrotechnic heat source is a non-conductive pyrotechnic material selected from the group consisting of zirconium/barium chromate paper; or
   the flexible pyrotechnic heat source is a conductive pyrotechnic material selected from the group consisting of iron/potassium perchlorate/polymer, or mixtures of nickel/zirconium/potassium perchlorate/polymer.

10. The thermal battery of claim 1, wherein the cathode material comprises:
    at least one active material selected from the group consisting of $FeS_2$, FeS, $NiS_2$, and $CoS_2$;
    a catholyte comprising a salt capable of melting at an operating temperature of the thermal battery; and
    a polymeric binder that does not generate a deleterious reaction at the operating temperature of the thermal battery, wherein the polymeric binder further comprises polymethylmethacrylate as a releasing agent.

11. The thermal battery of claim 2, wherein the separator material comprises:

a salt capable of melting at an operating temperature of the thermal battery;

an inorganic material capable of immobilizing the molten salt; and a polymeric binder that does not generate a deleterious reaction at the operating temperature of the thermal battery.

12. The thermal battery of claim 11, wherein the inorganic material is selected from the group consisting of magnesium oxide and aluminum oxide.

13. The thermal battery of claim 1, wherein the anode material comprises:

at least one active material selected from the group consisting of LiSi and LiAl;

an anolyte comprising a salt capable of melting at an operating temperature of the thermal battery; and a polymeric binder that does not generate a deleterious reaction at the operating temperature of the thermal battery, wherein the polymeric binder further comprises polymethylmethacrylate as a releasing agent.

14. The thermal battery of claim 1, wherein the separator material further comprises magnesium oxide, polyisobutylene, toluene and silicone-coated biaxially-oriented polyethylene terephthalate.

15. A method of manufacturing a thermal spiral wound battery comprising:

preparing a first slurry comprising an anode material, a first polymeric binder, and a first volatile solvent;

depositing the anode material from the first slurry onto a first conductive substrate to form a first conductive layer;

preparing a second slurry comprising a cathode material, a second polymeric binder, and a second volatile solvent;

depositing the cathode material from the second slurry onto a second conductive substrate to form a second conductive layer;

preparing a third slurry comprising an electrolyte/separator material, a third polymeric binder and a third volatile solvent, wherein the third polymeric binder comprises of polymethylmethacrylate present in about 10 wt % to about 30 wt % of the third polymeric binder;

depositing the electrolyte/separator material from the third slurry onto a third conductive substrate to form a separator layer;

stacking the first conductive layer, the separator layer, and the second conductive layer such that the separator layer separates the first conductive layer and the second conductive layer;

winding the first conductive layer, the separator layer, and the second conductive layer together into a spiral wound configuration, wherein the first conductive layer and the second conductive layer are offset from each other such that the first conductive layer extends beyond the separator layer and the second conductive layer in a first direction, while the second conductive layer extends beyond the separator layer and the first conductive layer in a second direction, which opposes the first direction;

connecting a first conductive tab to the first conductive layer and a second conductive tab connected to the second conductive layer, such that the first conductive tab and the second conductive tab protrude from the spiral wound configuration, wherein the first conductive tab is further joined to an anode current collector, a first external battery terminal and a battery casing, and wherein the second conductive tab is further joined to a cathode current collector, a second external battery terminal and the battery casing;

adding a flexible pyrotechnic heat source before winding the conductive substrate; and winding the flexible pyrotechnic heat source spirally into the spiral wound configuration.

16. The method of claim 15, wherein depositing the anode material, the cathode material, or the electrolyte/separator material from the first slurry, the second slurry, or the third slurry onto the first conductive substrate, the second conductive substrate, or the third conductive substrate comprises:

casting the slurry under a doctor blade to deposit a controlled amount of the slurry; and evaporating the volatile solvent to form the first conductive layer, the second conductive layer, or the separator layer.

17. The method of claim 15, wherein each of the first conductive tab and the second conductive tab comprises a material selected from a group consisting of iron, stainless steel, nickel, aluminum and copper.

18. The method of claim 15, wherein the flexible pyrotechnic heat source is located between the first conductive layer and the second conductive layer.

* * * * *